US011975423B2

(12) United States Patent
Ikuta et al.

(10) Patent No.: US 11,975,423 B2
(45) Date of Patent: May 7, 2024

(54) SCREW-TIGHTENING TOOL

(71) Applicant: MAKITA CORPORATION, Anjo (JP)

(72) Inventors: Hiroki Ikuta, Anjo (JP); Ryo Imuta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 456 days.

(21) Appl. No.: 17/439,428

(22) PCT Filed: Apr. 10, 2020

(86) PCT No.: PCT/JP2020/016182
§ 371 (c)(1),
(2) Date: Sep. 15, 2021

(87) PCT Pub. No.: WO2020/213539
PCT Pub. Date: Oct. 22, 2020

(65) Prior Publication Data

US 2022/0152792 A1 May 19, 2022

(30) Foreign Application Priority Data

Apr. 16, 2019 (JP) ................................ 2019-077899

(51) Int. Cl.
*B25B 21/00* (2006.01)
*B25B 23/14* (2006.01)

(52) U.S. Cl.
CPC .............. *B25B 21/00* (2013.01); *B25B 23/14* (2013.01)

(58) Field of Classification Search
CPC ..... B25B 21/00; B25B 21/002; B25B 21/004; B25B 21/007; B25B 21/008; B25B 23/14;
(Continued)

(56) References Cited

U.S. PATENT DOCUMENTS 2,839,952 A * 6/1958 Ondeck ............... B25B 23/0035 81/476
2012/0160530 A1* 6/2012 Ikuta ....................... B25B 21/00 173/13
(Continued)

FOREIGN PATENT DOCUMENTS

JP H11-193851 A 7/1999
JP 2002-293285 A 10/2002
(Continued)

OTHER PUBLICATIONS

Jun. 9, 2020 International Search Report issued in International Patent Application No. PCT/JP2020/016182.

*Primary Examiner* — Robert J Scruggs
(74) *Attorney, Agent, or Firm* — Oliff PLC

(57) ABSTRACT

A screw-tightening tool includes a housing, a spindle, a motor, and a power-transmitting mechanism including a sun member, a ring member, a carrier member and a planetary roller. The power-transmitting mechanism is configured such that, when the ring member moves rearward to be closer to the sun member in response to rearward movement of the spindle, the planetary roller transmits power of the motor to the spindle owing to frictional force between the planetary roller and each of a first tapered surface of the sun member and a second tapered surface of the ring member. The sun member is configured to move from a first position to a second position, which is forward of the first position, when the frictional force reaches a threshold, and to move from the second position to the first position when the frictional force falls below the threshold.

15 Claims, 9 Drawing Sheets

(58) Field of Classification Search
CPC ..... B25B 23/141; B25B 23/147; B25F 5/001; F16H 3/54; F16H 3/58; F16H 3/64; F16H 13/08; F16H 2200/201; F16H 2200/0034; F16H 2200/2064
See application file for complete search history.

(56) References Cited

U.S. PATENT DOCUMENTS

| | | | | |
|---|---|---|---|---|
| 2012/0160535 | A1* | 6/2012 | Ikuta | B25B 21/00 173/176 |
| 2017/0129092 | A1* | 5/2017 | Kimura | B25B 23/14 |

FOREIGN PATENT DOCUMENTS

| | | | |
|---|---|---|---|
| JP | 2009-072903 | A | 4/2009 |
| JP | 2012-135842 | A | 7/2012 |
| JP | 2012-135843 | A | 7/2012 |
| WO | 2009/027821 | A2 | 3/2009 |

* cited by examiner

SCREW-TIGHTENING TOOL

TECHNICAL FIELD

The present invention relates to a screw-tightening tool that is configured to rotationally drive a tool accessory.

BACKGROUND

A screw-tightening tool is known that includes a power-transmitting mechanism (clutch) that transmits power of a motor to a spindle when the spindle is pushed. For example, Japanese laid-open patent publication No. 2012-135842 discloses a screwdriver having a so-called planetary-roller-type power-transmitting mechanism. The power-transmitting mechanism includes a fixed hub, a drive gear, planetary rollers disposed between tapered surfaces of the fixed hub and the drive gear, and a retaining member for the planetary rollers fixed to the spindle. When the drive gear is rotated by power of the motor and the spindle is pushed rearward, the planetary rollers get into frictional contact with the tapered surfaces of the fixed hub and the drive gear and generate frictional force. The rotational force is transmitted to the spindle by the frictional force, and thus a screw is tightened.

SUMMARY

Technical Problem

In the above-described planetary-roller-type power-transmitting mechanism, as a screw-tightening operation progresses and thus a rearward pushing force applied to the spindle gradually decreases, the frictional force between the planetary rollers and the tapered surfaces decreases. As a result, when rotational force transmitted from the drive gear to the spindle falls below rotational force that is necessary for tightening the screw, power transmission is interrupted and the spindle stops rotating. However, at the end of the screw-tightening operation, the rotational force transmitted from the drive gear to the spindle may fluctuate, and thereby the moment the spindle stops rotating may be unstable.

Accordingly, in consideration of such circumstances, it is an object of the present invention to provide improvement for promptly interrupting power transmission to a spindle at the end of screw tightening, in a screw-tightening tool including a planetary-roller-type power-transmitting mechanism.

Solution to Problem

According to one aspect of the present invention, a screw-tightening tool is provided that is configured to tighten a screw by rotationally driving a tool accessory. The screw-tightening tool includes a housing, a spindle, a motor and a power-transmitting mechanism.

The spindle is supported by the housing to be movable in a front-rear direction along a driving axis, which defines the front-rear direction of the screw-tightening tool, and to be rotatable around the driving axis. The spindle has a front end portion that is configured such that the tool accessory is removably coupled thereto. The motor is housed in the housing. The power-transmitting mechanism includes a sun member, a ring member, a carrier member and a planetary roller, and is housed in the housing. The sun member, the ring member and the carrier member are arranged coaxially with the driving axis. The planetary roller is rotatably retained by the carrier member. The sun member and the ring member have a first tapered surface and a second tapered surface, respectively. Each of the first tapered surface and the second tapered surface is inclined relative to the driving axis. The power-transmitting mechanism is configured such that, when the ring member moves rearward to be closer to the sun member in response to rearward movement of the spindle, the planetary roller gets into frictional contact with the first tapered surface and with the second tapered surface and transmits power of the motor to the spindle owing to frictional force between the planetary roller and each of the first tapered surface and the second tapered surface. The sun member is movable in the front-rear direction between a first position and a second position, which is forward of the first position. The sun member is configured to move from the first position to the second position when the frictional force reaches a threshold, and to move from the second position to the first position when the frictional force falls below the threshold.

The screw-tightening tool of the present aspect includes the power-transmitting mechanism that is configured to transmit power using the frictional force between the planetary roller and each of the first tapered surface of the sun member and the second tapered surface of the ring member. The sun member moves from the first position to the second position, which is forward of the first position, when the frictional force reaches the threshold, and the sun member moves from the second position to the first position, which is rearward of the second position, when the frictional force falls below the threshold. In other words, when the frictional force falls below the threshold, the sun member moves away from the ring member. Thus, the power transmission to the spindle can be promptly interrupted in response to the friction force falling below the threshold at the end of the screw-tightening operation.

In one aspect of the present invention, the screw-tightening tool may further comprise a spring member and a motion converting mechanism. The spring member biases the sun member toward the first position. The motion converting mechanism is configured to convert rotation of the sun member around the driving axis into linear motion of the sun member in the front-rear direction. The ring member may be configured to be rotated by the power of the motor. The sun member may be configured to be rotated by the power transmitted from the ring member and to be moved to the second position by the motion converting mechanism against a biasing force of the spring member when the frictional force reaches the threshold in a state in which the sun member is located at the first position. According to the present aspect, the spring member and the motion converting mechanism can realize a rational structure that is configured to hold the sun member in the first position when the frictional force is below the threshold and to move the sun member to the second position when the frictional force reaches the threshold. The motion converting mechanism may be typically configured as a cam mechanism that utilizes an inclined surface or an inclined groove.

In one aspect of the present invention, the carrier member may be movable together with the sun member in the front-rear direction relative to the spindle. Further, the spring member may bias the sun member rearward via the carrier member. According to the present aspect, a positional relationship between the sun member and the carrier member can be appropriately maintained using the biasing force of the spring member.

In one aspect of the present invention, the screw-tightening tool may further comprise a rotation restricting part that is configured to define an angle range in which the sun member is rotatable around the driving axis. In the present aspect, the rotation of the sun member may be converted into the linear motion in the front-rear direction by the motion converting mechanism. Thus, by defining the angle range in which the sun member is rotatable, the rotation restricting part can define a distance in which the sun member is movable in the front-rear direction. In this manner, the first position and the second position of the sun member can be defined, so that a positional relationship between the ring member and the sun member can be stabilized.

In one aspect of the present invention, the spring member may bias the spindle and the sun member forward and rearward, respectively. According to the present aspect, the single spring member can bias the sun member toward the first position and can also return the spindle to the foremost position when pushing of the spindle is cancelled.

In one aspect of the present invention, the spring member may bias the ring member and the sun member away from each other.

In one aspect of the present invention, the spring member may bias the ring member and the carrier member away from each other.

In one aspect of the present invention, the screw-tightening tool may further comprise a cam member that is formed separately from the housing and that is coupled to the housing to be non-rotatable around the driving axis. Further, the motion converting mechanism may be configured as a cam mechanism that includes a first cam part disposed on the cam member and a second cam part disposed on the sun member. According to the present aspect, a cam mechanism can be easily manufactured, since the cam part can be first formed on the cam member and the cam member can be coupled to the housing afterwards.

In one aspect of the present invention, the motor may be configured to be rotationally driven in a normal direction and in a reverse direction. The normal direction corresponds to a direction in which the tool accessory tightens the screw. The reverse direction corresponds to a direction in which the tool accessory loosens the screw. Further, the sun member may be configured to move between the first position and the second position only when the motor is rotationally driven in the normal direction. In loosening a screw, a user can easily cause the power transmission to the spindle to be interrupted, by confirming loosening of the screw and then stopping pushing the spindle. Thus, by allowing the sun member to be movable between the first position and the second position only in tightening a screw, the need for a complicated structure can be eliminated.

In one aspect of the present invention, the ring member may be configured to be rotated by the power of the motor. Further, the carrier member may be configured to rotate integrally with spindle.

DESCRIPTION OF EMBODIMENTS

A screwdriver 1 according to an embodiment of the present invention is now described with reference to the drawings. The screwdriver 1 is an example of a screw-tightening tool that is configured to rotationally drive a tool accessory. More specifically, the screwdriver 1 is an example of a screw-tightening tool that is capable of performing a screw-tightening operation and a screw-loosening operation by rotationally driving a driver bit 9 coupled to a spindle 3.

Figure 1:
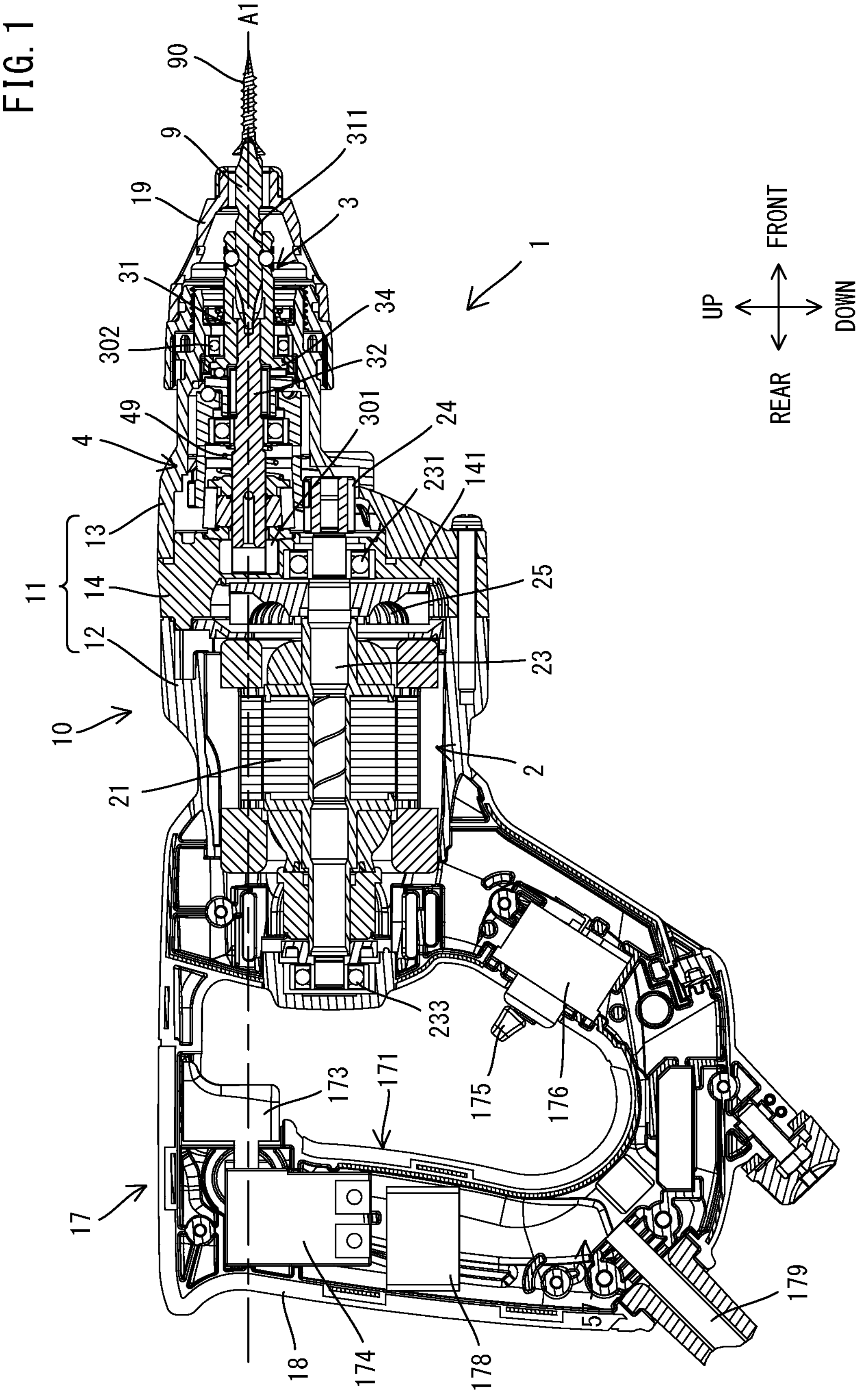
FIG. 1 is a sectional view of a screwdriver.

First, the general structure of the screwdriver 1 is described. As shown in FIG. 1, the screwdriver 1 has a body 10, which includes a motor 2 and the spindle 3, and a handle 17. The body 10 has an elongate shape as a whole, extending along a specified driving axis A1. The driver bit 9 is removably coupled to one end portion of the body 10 in a longitudinal direction (an axial direction of the driving axis A1). The handle 17 is C-shaped as a whole and connected to the other end portion of the body 10 in the longitudinal direction so as to form a loop shape. The handle 17 includes a grip part 171 to be held by a user. The grip part 171 is a portion of the handle 17 that is spaced apart from the body 10 and linearly extends in a direction that is generally orthogonal to the driving axis A1. One end portion in a longitudinal direction of the grip part 171 is located on the driving axis A1. A trigger 173 to be depressed by the user is provided on this end portion. A power cable 179 that is connectable to an external alternate current power source is connected to the other end portion of the grip part 171.

In the screwdriver 1 of the present embodiment, when the trigger 173 is depressed by the user, the motor 2 is driven. Further, when a screw 90 is pressed against a workpiece and the spindle 3 is pushed rearward, power of the motor 2 is transmitted to the spindle 3 and the driver bit 9 is rotationally driven. In this manner, the screw-tightening operation or the screw-loosening operation is performed.

The detailed structure of the screwdriver 1 is now described. In the following description, for convenience sake, the axial direction (extension direction) of the driving axis A1 is defined as a front-rear direction of the screwdriver 1. In the front-rear direction, the side to which the driver bit 9 is removably coupled is defined as a front side, and the side on which the grip part 171 is disposed is defined as a rear side. A direction that is orthogonal to the driving axis A1 and that corresponds to the extension direction of the grip part 171 is defined as an up-down direction. In the up-down direction, the side on which the trigger 173 is disposed is defined as an upper side and the side to which the power cable 179 is connected is defined as a lower side. A direction that is orthogonal to the front-rear direction and the up-down direction is defined as a left-right direction.

The body 10 and the handle 17 are now briefly described. As shown in FIG. 1, an outer shell of the body 10 is mainly formed by a body housing 11. The body housing 11 includes a rear housing 12, a front housing 13, and a central housing 14. The rear housing 12 is a tubular portion that houses the motor 2. The front housing 13 is a tubular portion that houses the spindle 3. The central housing 14 is a portion disposed between the rear housing 12 and the front housing 13. A front end portion of the central housing 14 has a partition wall 141 that is generally orthogonal to the driving axis A1. The central housing 14 and the front housing 13 are fixed to the rear housing 12 by screws, so that the three housings are integrated together as the body housing 11. The detailed structure of the body 10, including structures disposed within the body housing 10, will be described later.

A hollow cylindrical locator 19 is removably coupled onto a front end portion of the front housing 13 such that the locator 19 covers the front end portion. The locator 19 is movable in the front-rear direction relative to the front housing 13 and can be fixed at any position by the user. In this manner, a screwing depth, that is, an amount of protrusion of the driver bit 9 from the locator 19 can be defined.

As shown in FIG. 1, an outer shell of the handle 17 is mainly formed by a handle housing 18. The handle housing 18 is formed by right and left halves. The left half is integrally formed with the rear housing 12. The handle housing 18 houses a main switch 174, a rotation-direction switch 176 and a controller 178.

The main switch 174 is a switch for starting the motor 2 and is disposed within the grip part 171 behind the trigger 173. The main switch 174 is normally kept in an OFF state and switched to an ON state when the trigger 173 is depressed. The main switch 174 outputs a signal indicating the ON state or OFF state to the controller 178 via an unshown wiring.

A switching lever 175 is provided in a portion of the handle housing 18 that connects a lower end portion of the grip part 171 and a lower rear end portion of the body 10 (the rear housing 12). The switching lever 175 is a member for switching a rotational direction of the driver bit 9 (specifically, a rotational direction of the motor 2). By manipulating the switching lever 175, the user can set the rotational direction of the motor 2 (the motor shaft 23) to either one of a direction (a normal direction or a screw-tightening direction) in which the driver bit 9 tightens the screw 90 and a direction (a reverse direction or a screw-loosening direction) in which the driver bit 9 loosens the screw 90. The rotation-direction switch 176 outputs a signal corresponding to the rotational direction set via the switching lever 175, to the controller 178 via an unshown wiring.

The controller 178 includes a control circuit and is disposed below the main switch 174. The controller 178 is configured to drive the motor 2 in the normal direction or in the reverse direction according to the rotational direction indicated by the signal from the rotation-direction switch 176 while the signal from the main switch 174 indicates the ON state.

The detailed structure of the body 10, including the structures disposed within the body 10, is now described.

As shown in FIG. 1, the rear housing 12 houses the motor 2. The motor 2 has the motor shaft 23 extending from a rotor 21. The motor shaft 23 extends in parallel to the driving axis A1 (in the front-rear direction) below the driving axis A1. The motor shaft 23 is rotatably supported at its front and rear end portions by bearings 231 and 233. The front bearing 231 is supported by the partition wall 141 of the central housing 14. The rear bearing 233 is supported by a rear end portion of the rear housing 12. Further, a fan 25 for cooling the motor 2 is fixed to a portion of the motor shaft 23 in front of the rotor 21. The fan 25 is housed within the central housing 14. A front end portion of the motor shaft 23 protrudes into the front housing 13 through a through hole formed in the partition wall 141. A pinion gear 24 is formed on the front end portion of the motor shaft 23.

The front housing 13 houses the spindle 3 and a power-transmitting mechanism 4. The detailed structures thereof are now described in this order.

The spindle 3 is an elongate member shaped like a solid circular cylinder, and extends in the front-rear direction along the driving axis A1. In the present embodiment, a front shaft 31 and a rear shaft 32, which are separately formed, are fixedly connected and integrated together to form the spindle 3. However, the spindle 3 may be formed by only a single shaft. The spindle 3 has a flange 34. The flange 34 is disposed on a central portion of the spindle 3 in the front-rear direction (specifically, a rear end portion of the front shaft 31) and protrudes radially outward.

The spindle 3 is supported by a bearing (specifically, a plain bearing) 301 and a bearing (specifically, a ball bearing) 302 so as to be rotatable around the driving axis A1 and to be movable along the driving axis A1 in the front-rear direction. The bearing 301 is supported by the partition wall 141 of the central housing 14. The bearing 302 is supported by a front end portion of the front housing 13. The spindle 3 is always biased forward by a biasing force of a biasing spring 49, which will be described later. Accordingly, in an initial state in which an external rearward force is not applied to the spindle 3, the spindle 3 is held in a position where a front end surface of the flange 34 is in contact with a stopper part 135 (see FIG. 2) provided within the front housing 13. The position of the spindle 3 at this time is a foremost position (also referred to as an initial position) within a movable range of the spindle 3.

A front end portion of the spindle 3 (the front shaft 31) protrudes from the front housing 13 into the locater 19. A bit-insertion hole 311 is formed along the driving axis A1 in the front end portion of the spindle 3 (the front shaft 31). Steel balls biased by a flat spring may be engaged with a small-diameter portion of the driver bit 9 inserted into the bit-insertion hole 311, so that the driver bit 9 is removably held.

The power-transmitting mechanism 4 is now described.

Figure 2:
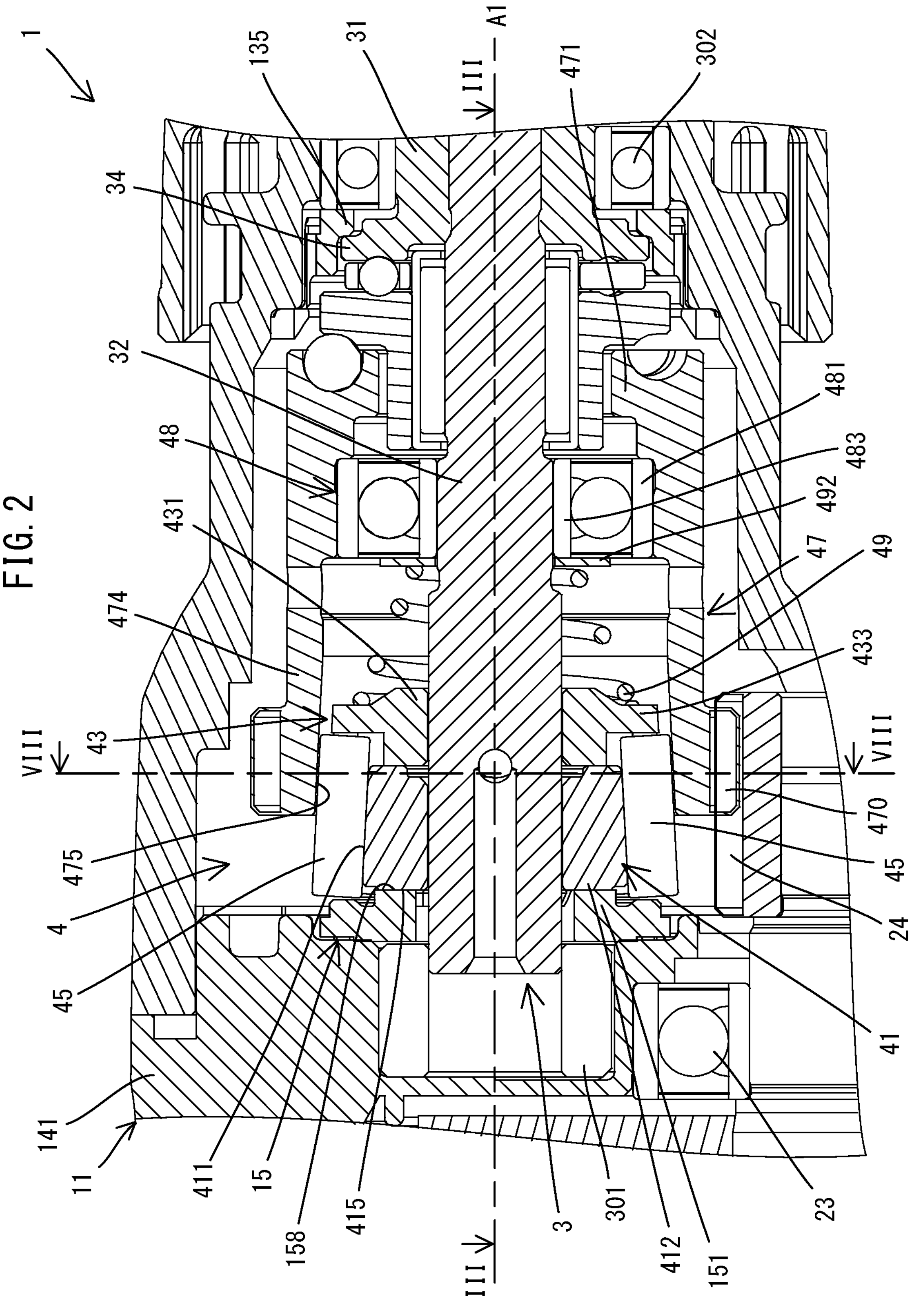
FIG. 2 is a partial, enlarged view of FIG. 1.
Figure 3:
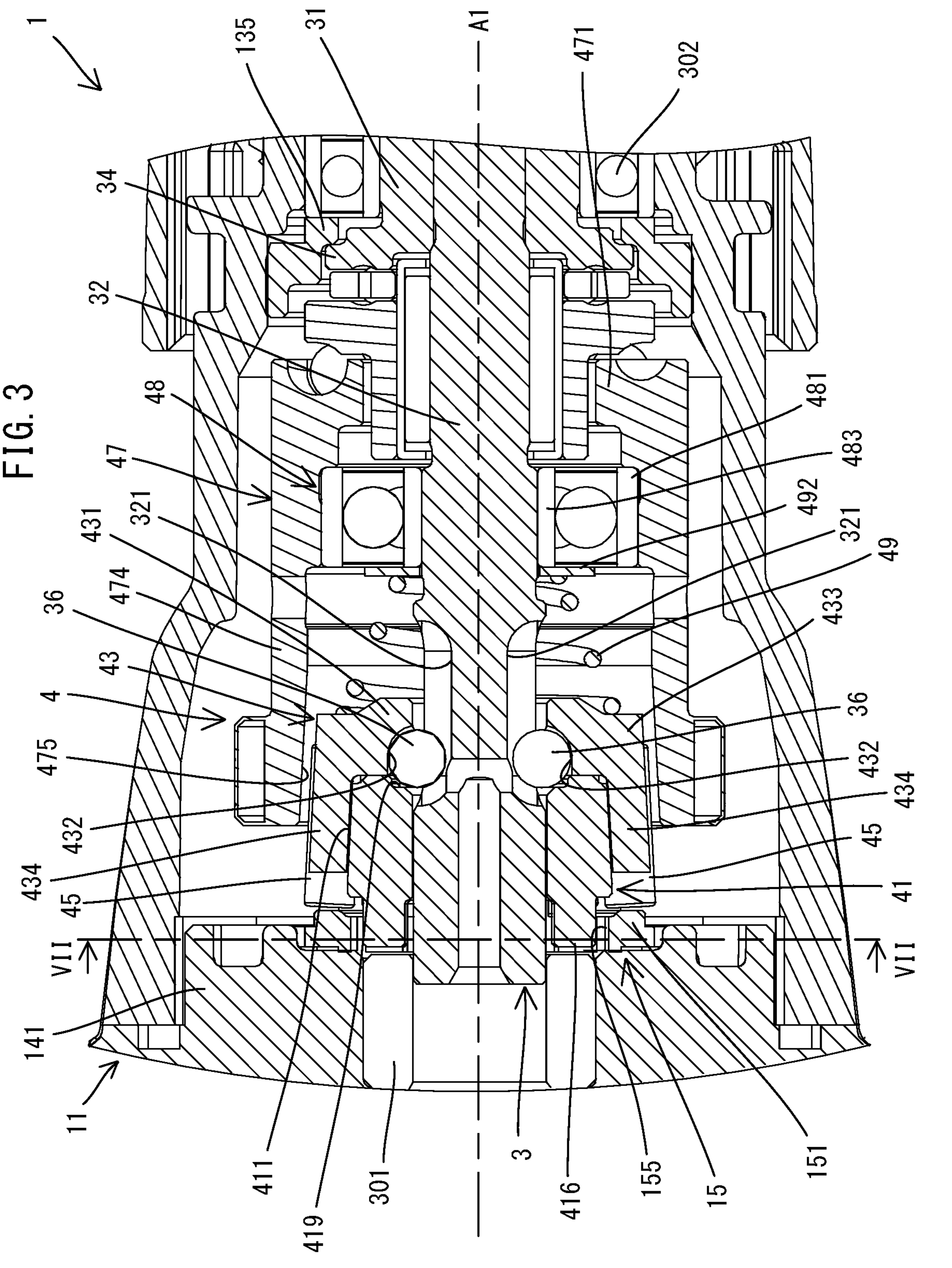
FIG. 3 is a sectional view taken along line III-III in FIG. 2.

The power-transmitting mechanism 4 is a mechanism that transmits power of the motor 2 to the spindle 3. As shown in FIGS. 2 and 3, the power-transmitting mechanism 4 of the present embodiment is mainly formed by a planetary mechanism (ecliptic gearing) that includes a tapered sleeve 41, a retainer 43, a plurality of rollers 45 and a gear sleeve 47. The tapered sleeve 41, the retainer 43 and the gear sleeve 47 are arranged coaxially with the spindle 3 (with the driving axis A1). The tapered sleeve 41, the retainer 43, the rollers 45 and the gear sleeve 47 correspond to a sun member, a carrier member, planetary members and a ring member of the planetary mechanism, respectively. In the present embodiment, the power-transmitting mechanism 4 is structured as a so-called solar-type planetary speed-reducing mechanism, in which the tapered sleeve 41 serves as a fixed element, the gear sleeve 47 serves as an input element, and the retainer 43 serves as an output element. Therefore, the gear sleeve 47 and the retainer 43 (the spindle 3) rotate in the same direction. In the present embodiment, the tapered sleeve 41 does not rotate and serves as a fixed element in transmitting power to the spindle. The tapered sleeve 41, however, rotates within a specified angle range under specific circumstances, as will be described later.

The power-transmitting mechanism 4 is configured to transmit the power of the motor 2 to the spindle 3 and to interrupt the power transmission. Specifically, when the spindle 3 moves rearward and thus the rollers 45 come into frictional contact with the tapered sleeve 41 and with the gear sleeve 47, the power-transmitting mechanism 4 transmits the power of the motor 2 to the spindle 3 owing to frictional force generated between the rollers 45 and the tapered sleeve 41 and between the rollers and the gear sleeve 47. Further, when the frictional force between the rollers 45 and the tapered sleeve 41 and the frictional force between the rollers 45 and the gear sleeve 47 decreases to some extent, the power-transmitting mechanism 4 interrupts the power transmission from the motor 2 to the spindle 3. Thus, the power-transmitting mechanism 4 of the present embodiment can also be referred to as a planetary-roller-type friction clutch mechanism.

The detailed structure and the arrangement of each of the components of the power-transmitting mechanism 4 are now described.

Figure 4:
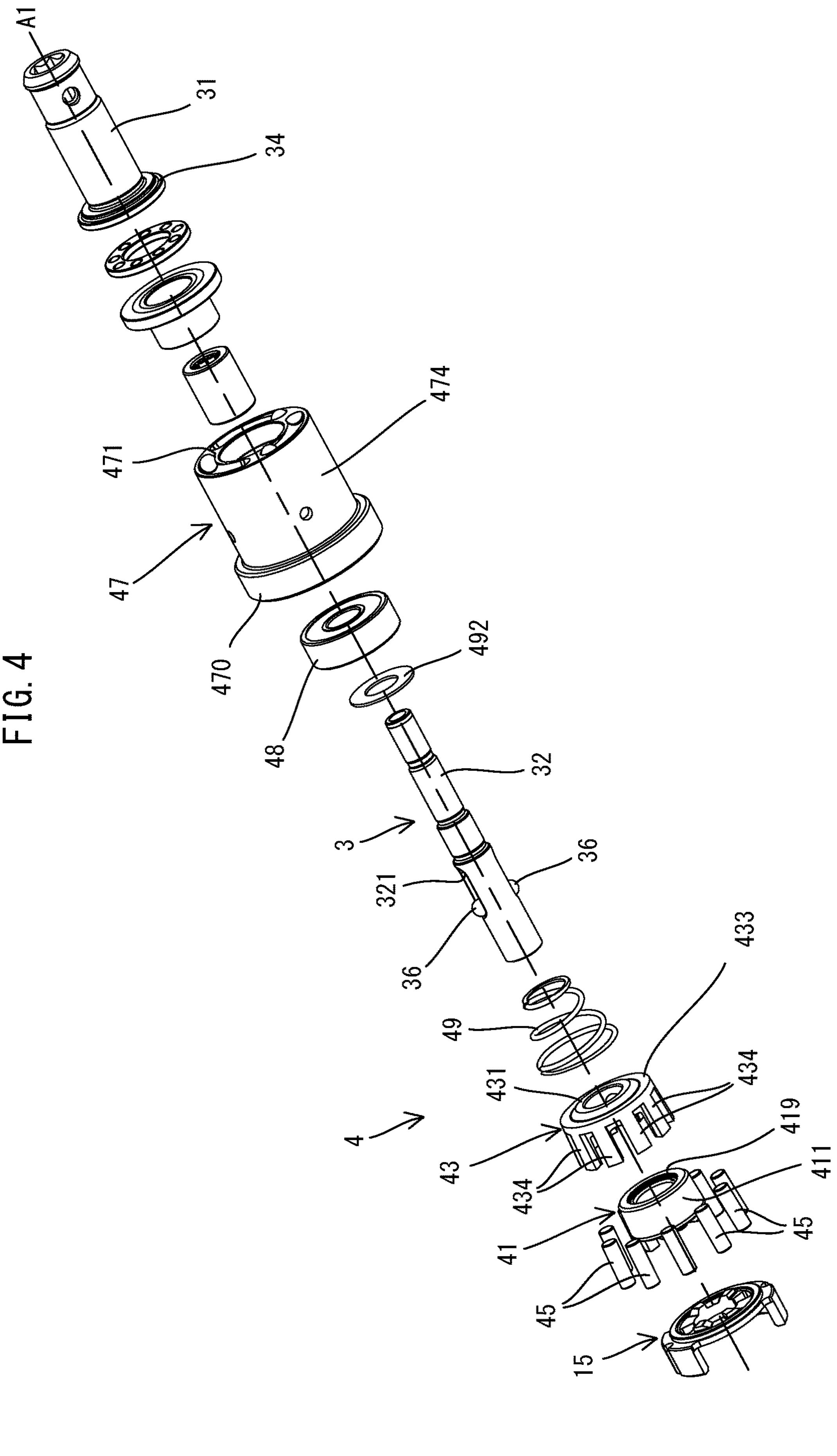
FIG. 4 is an exploded perspective view showing a spindle and a power-transmitting mechanism.

First, the tapered sleeve 41 is described. As shown in FIGS. 2 to 4, the tapered sleeve 41 is structured as a tubular member and is loosely disposed around the spindle 3. An outer peripheral surface of the tapered sleeve 41 is configured as a tapered surface 411 that is inclined at a specified angle relative to the driving axis A1. More specifically, the tapered sleeve 41 has a truncated conical outer shape that is tapered forward (having a diameter decreasing toward the front). The tapered surface 411 is configured as a conical surface that is inclined forward in a direction toward the driving axis A1.

A base 15 is coupled to the body housing 11. The tapered sleeve 41 is configured to be movable in the front-rear direction within a specified range relative to the body housing 11 and to be rotatable around the driving axis A1 within a specified range in a state in which the tapered sleeve 41 is in contact with the base 15. More specifically, the base 15 and the tapered sleeve 41 have a motion converting mechanism (specifically, a cam mechanism), which converts rotation of the tapered sleeve 41 around the driving axis A1 into linear motion of the tapered sleeve 41 in the front-rear direction.

Figure 5:
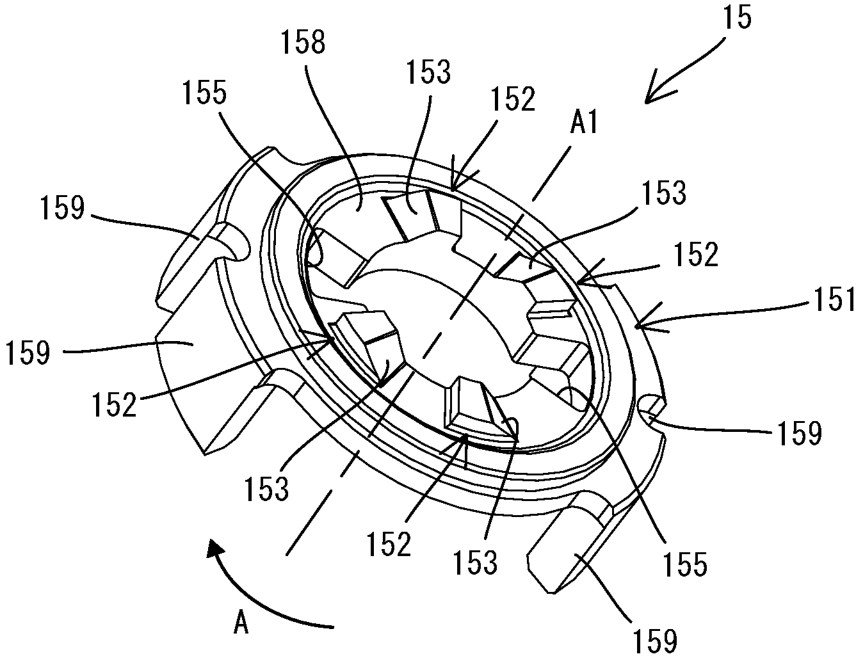
FIG. 5 is a perspective view of a base as viewed from front.

The base 15 is formed as a member that is originally separate (discrete) from the body housing 11 and is coupled to the body housing 11 so as to be coaxial with the driving axis A1. More specifically, as shown in FIG. 5, the base 15 includes a cam part 151 and a plurality of legs 159. The cam part 151 is formed in a generally annular shape as a whole. The legs 159 protrude rearward from an outer edge of the cam part 151. The legs 159 of the base 15 are fitted into recesses (not shown) that are formed in the partition wall 141 and thus the base 15 is coupled to the body housing 11 to be non-rotatable around the driving axis A1. The cam part 151 is disposed in front of the bearing 301 (see FIG. 2).

The cam part 151 includes four cam protrusions 152 protruding forward. The cam protrusions 152 are arranged apart from each other in a circumferential direction around the driving axis A1. Each of the cam protrusions 152 has an inclined surface 153 that is provided on its one end portion in the circumferential direction. More specifically, the inclined surface 153 is disposed in an end portion at an upstream side of the cam projection 152 in a clockwise direction as viewed from a front-surface side (a direction of arrow A in FIG. 5). The inclined surface 153 is inclined forward from the upstream side to a downstream side (it can be rephrased that the inclined surface 153 is inclined such that a protruding height of the cam projection 152 gradually increases toward the downstream side).

Figure 6:
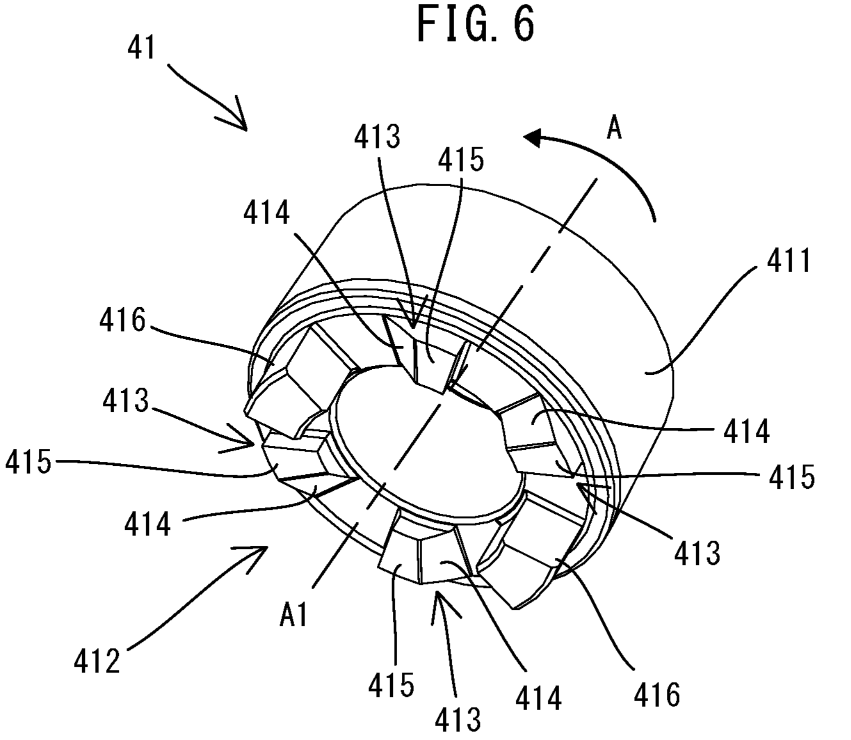
FIG. 6 is a perspective view a tapered sleeve as viewed from behind.

As shown in FIG. 6, a rear end portion of the tapered sleeve 41 is configured as a cam part 412. The cam part 412 includes four cam protrusions 413 protruding rearward. The cam protrusions 413 are arranged apart from each other in the circumferential direction around the driving axis A1. Each of the cam protrusions 413 has an inclined surface 414 that is provided on its one end portion in the circumferential direction. More specifically, the inclined surface 414 is disposed in an end portion at a downstream side in a counterclockwise direction as viewed from a rear surface side (a direction of arrow A in FIG. 6 (the clockwise direction as seen from the front surface side)). The inclined surface 414 is an inclined surface that conforms to (matches) the inclined surface 153, and is inclined forward from an upstream side to the downstream side (it can be rephrased that the inclined surface 414 is inclined such that a protruding height of the cam projection 413 gradually decreases toward the downstream side).

Figure 7:
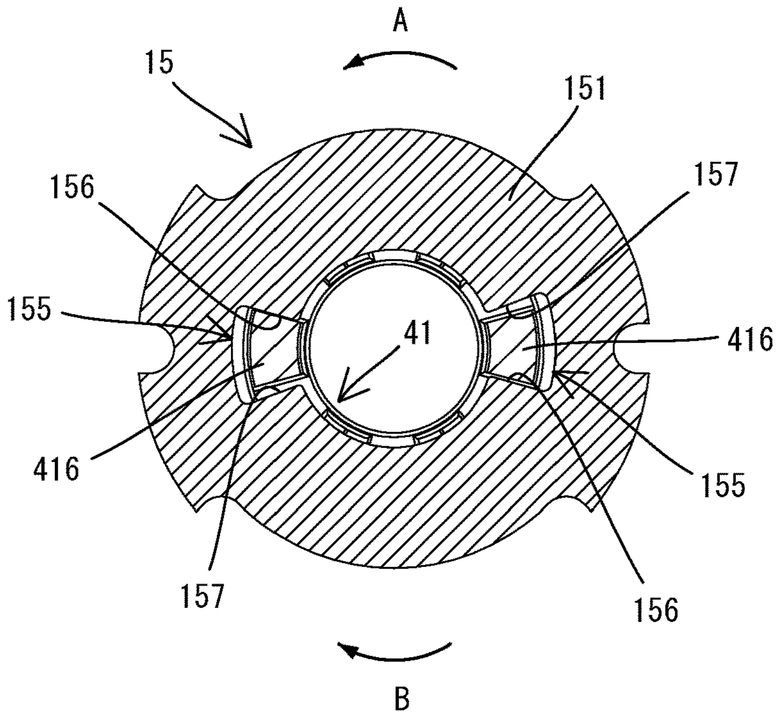
FIG. 7 is a sectional view taken along line VII-VII in FIG. 3 (wherein only the base and the tapered sleeve are shown).

The tapered sleeve 41 and the base 15 also have structures that restrict a rotatable range of the tapered sleeve 41 around the driving axis A1. More specifically, as shown in FIG. 6, a pair of (two) restricting protrusions 416, which protrude rearward, is provided on the rear end portion of the tapered sleeve 41. The two restricting protrusions 416 are arranged opposite to each other across the driving axis A1. As shown in FIG. 5, a pair of (two) restricting recesses 155, which are recessed radially outward from an inner circumferential end of the cam part 151, is formed in the cam part 151 of the base 15. The two restricting recesses 155 are arranged opposite to each other across the driving axis A1. The two restricting protrusions 416 are inserted into the restricting recesses 155, respectively. As shown in FIG. 7, a length of the restricting recess 155 in the circumferential direction (also referred to as a relative rotational direction between the base 15 and the tapered sleeve 41) is set to be longer than a length of the restricting protrusion 416 in the circumferential direction. Thus, the tapered sleeve 41 is rotatable around the driving axis A1 relative to the base 15 within a range in which the restricting protrusion 416 can move within the restricting recess 155.

The tapered sleeve 41 is biased rearward. When the spindle 3 is pushed, the tapered sleeve 41 is held in a state in which at least a portion of the inclined surface 153 and at least a portion of the inclined surface 414 are in contact with each other, as will be described in detail later. In this state, when the tapered sleeve 41 is rotated relative to the base 15, the tapered sleeve 41 moves in the front-rear direction relative to the base 15 owing to interaction between the cam parts 412 and 151. Owing to the above-described structures of the inclined surfaces 153 and 414, when the tapered sleeve 41 is rotated relative to the base 15 in the counterclockwise direction as viewed from the rear surface side (in the direction of arrow A in FIGS. 5 and 6 (in the clockwise direction as viewed from the front surface side)), the tapered sleeve 41 moves forward relative to the base 15. As described above, the rotatable range of the tapered sleeve 41 is restricted by the restricting protrusions 416 and the restricting recesses 155. Therefore, a movable distance over which the tapered sleeve 41 can move in the front-rear direction is restricted in accordance with the rotatable range. A length of each restricting protrusion 416 is set to be longer than the movable distance of the tapered sleeve 41 in the front-rear direction.

Next, the retainer 43 is described. The retainer 43 is a member that rotatably retains the rollers 45. As shown in FIGS. 2 to 4, the retainer 43 has a bottom wall 431, a flange 433, and a plurality of retaining arms 434.

The bottom wall 431 is a generally hollow cylindrical portion having a through hole in its center. The flange 433 is an annular portion protruding radially outward from a front end portion of the bottom wall 431. The retaining arms 434 are spaced apart from each other in a circumferential direction and protrude generally rearward from a rear surface of a peripheral edge portion of the flange 433. Each of the retaining arms 434 extends at the same inclination angle as the tapered surface 411 of the tapered sleeve 41 relative to the driving axis A1 (in other words, in parallel to the tapered surface 411). A space between the retaining arms 434 adjacent to each other in the circumferential direction serves as a retaining space for the roller 45. A front end of this space is closed by the flange 433. A rear surface of the flange 433 serves as a restricting surface that gets into contact with front ends of the rollers 45 to restrict forward movement of the roller 45. A front surface of the flange 433 serves as a spring receiver that receives a rearward biasing force of a biasing spring 49, which is described later.

In the present embodiment, the retainer 43 is supported by the spindle 3 so as to be non-rotatable and to be movable in the front-rear direction relative to the spindle 3, in a state in which the retaining arms 434 are partially disposed radially outward of the tapered sleeve 41. More specifically, as shown in FIGS. 3 and 4, two grooves 321 are formed across the driving axis A1 in a rear end portion of the spindle 3. Each of the grooves 321 extends linearly in the front-rear direction. A steel ball 36 is rollably disposed in each of the grooves 321. Further, two recesses 432 are formed across the driving axis A1 in a rear surface of the bottom wall 431 of the retainer 43. A portion of the ball 36 disposed in the groove 321 is engaged with the recess 432. Furthermore, an annular recess 419 is formed in the center of a front end surface of the tapered sleeve 41. The retainer 43 is biased rearward by the biasing spring 49 and held in a state in which the balls 36 are each arranged within a space defined by the recesses 419 and 432, and a rear surface of the bottom wall 431 is in contact with the front end surface of the tapered sleeve 41, as will be described in detail later. At this time, rear ends of the retaining arms 434 are spaced apart forward from the base 15.

With such a structure, the retainer 43 is engaged with the spindle 3 via the balls 36 in the radial direction and in the circumferential direction of the spindle 3 so as to be rotatable together with the spindle 3. Further, the balls 36 can roll within the annular recess 419 of the tapered sleeve 41, and the retainer 43 can rotate around the driving axis A1 together with the spindle 3 relative to the tapered sleeve 41. The spindle 3 can move in the front-rear direction relative to the retainer 43 and the tapered sleeve 41 within the range in which the balls 36 can roll within the corresponding grooves 321.

Figure 8:
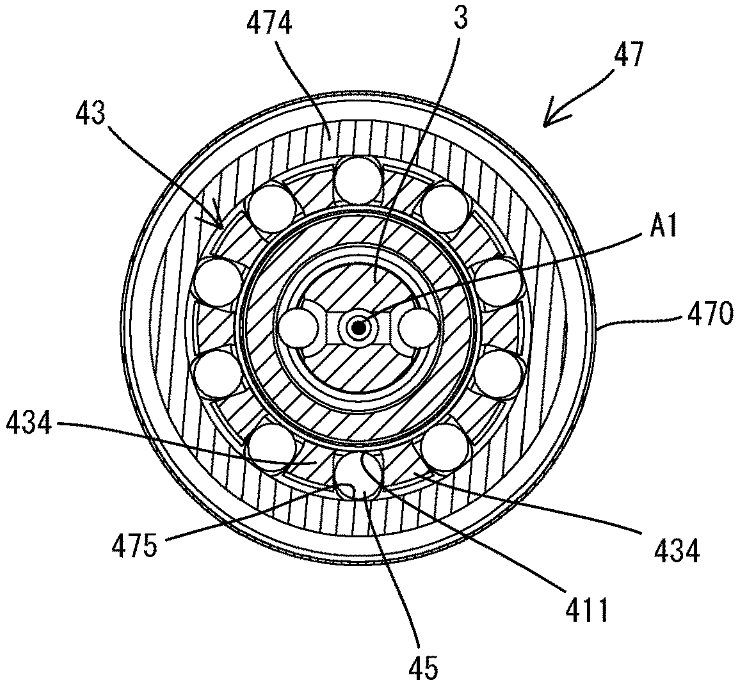
FIG. 8 is a view that corresponds to a sectional view taken along line VIII-VIII in FIG. 2, for illustrating a non-frictional-contact state between rollers and the tapered sleeve and between the rollers and a gear sleeve.

As shown in FIGS. 2 to 4, each of the rollers 45 is a circular columnar member. In the present embodiment, each of the rollers 45 has a constant diameter. Each of the rollers 45 is retained between the adjacent retaining arms 434 so as to be rotatable around a rotational axis extending generally in parallel to the tapered surface 411. The length of the roller 45 is set to be longer than that of the retaining arms 434. Further, as shown in FIG. 8, portions of an outer peripheral surface of the roller 45, which is retained between the retaining arms 434, slightly protrude from inner and outer surfaces of the retaining arms 434 in the radial direction of the retainer 43.

Next, the gear sleeve 47 is described. As shown in FIGS. 2 to 4, the gear sleeve 47 is structured as a generally cup-shaped member having an inner diameter that is larger than the outer diameters of the tapered sleeve 41 and the retainer 43. The gear sleeve 47 has a bottom wall 471 having a through hole and a cylindrical peripheral wall 474 contiguous to the bottom wall 471. An outer ring 481 of a bearing (specifically, a ball bearing) 48 is fixed to a portion of an inner peripheral surface of the peripheral wall 474 in the vicinity of the bottom wall 471. The gear sleeve 47 is disposed in front of the retainer 43, with the bottom wall 471 on the front side (that is, to be open to the rear). The gear sleeve 47 is supported by the spindle 3 inserted into an inner ring 483 of the bearing 48 so as to be rotatable relative to the spindle 3. Thus, a tubular internal space is formed between the spindle 3 and the peripheral wall 474 behind the bearing 48. The tapered sleeve 41, the retainer 43, a portion of each of the rollers 45, and the biasing spring 49 to be described below are disposed in this internal space. Further, gear teeth 470 are integrally formed on an outer periphery of the gear sleeve 47 (specifically, the peripheral wall 474). The gear teeth 47 are always engaged with the pinion gear 24. Thus, the gear sleeve 47 is rotationally driven along with rotation of the motor shaft 23.

As shown in FIGS. 2 and 3, a portion of an inner peripheral surface of the peripheral wall 474 of the gear sleeve 47, which extends rearward of the bearing 48, (a portion on the open end side) includes a tapered surface 475. The tapered surface 475 is inclined relative to the driving axis A1, at the same angle as the tapered surface 411 of the tapered sleeve 41 (in other words, extends in parallel to the tapered surface 411). Thus, the tapered surface 475 is structured as a conical surface that is inclined rearward (toward the open end of the gear sleeve 47) in a direction away from the driving axis A1. At least a portion (specifically, a front portion) of each of the rollers 45 retained by the retainer 43 is located between the tapered surface 411 and the tapered surface 475 in the radial direction of the spindle 3 (in the direction orthogonal to the driving axis A1).

In the present embodiment, the power-transmitting mechanism 4 includes the biasing spring 49 that is disposed between the gear sleeve 47 and the retainer 43 in the front-rear direction. In the present embodiment, the biasing spring 49 is configured as a conical coil spring. One end of the biasing spring 49 having a larger diameter is in contact with the front surface of the flange 433 of the retainer 43. The other end of the biasing spring 49 having a smaller diameter is in contact with a washer 492 disposed behind the inner ring 483 of the bearing 48. Thus, the biasing spring 49 can rotate together with the retainer 43, but is isolated from rotation of the gear sleeve 47.

The biasing spring 49 always biases the retainer 43 and the gear sleeve 47 away from each other, that is, rearward and forward, respectively. Thus, the retainer 43 is held in a position where the rear surface of the bottom wall 431 is in contact with the front end surface of the tapered sleeve 41 by the biasing force of the biasing spring 49, and thus movement of the retainer 43 in the front-rear direction is restricted. Further, the rollers 45 are held between the rear surface of the flange 433 of the retainer 43 and the front end surface of the base 15 and thus movement of the rollers 45 in the front-rear direction is restricted. The phrase "movement is restricted" herein means not only that movement is completely prevented, but also that slight movement is allowed.

As described above, the tapered sleeve 41 is also movable within the specified range in the front-rear direction, and the biasing spring 49 also biases the tapered sleeve 41 rearward via the retainer 43. Thus, in the initial state, as shown in FIG. 2, the tapered sleeve 41 is held in a position (hereinafter referred to as a rearmost position or an initial position) where protruding end surfaces (rear end surfaces) 415 of the cam protrusions 413 (see FIG. 6) are respectively in contact with flat surfaces (flat portions between the adjacent cam protrusions 152) 158 of the cam part 151 of the base 15 (see FIG. 5), and movement of the tapered sleeve 41 in the front-rear direction is restricted. At this time, as shown in FIG. 7, each of the restricting protrusions 416 of the tapered sleeve 41 is in contact with an end 156 at an upstream side in the counterclockwise direction (a direction of arrow A in FIG. 7) as viewed from behind, among two ends 156 and 157 in the circumferential direction of the corresponding restricting recess 155 of the base 15.

Further, since the gear sleeve 47 is biased forward by the biasing force of the biasing spring 49, the spindle 3 is also biased forward. Thus, in the initial state, the spindle 3 is held in the foremost position (the initial position). Although the detailed description thereof is omitted, multiple components are interposed between the gear sleeve 47 and the flange 34 of the spindle 3, and thus the biasing spring 49 biases the spindle 3 forward via the gear sleeve 47 and these interposed components. It is noted that these interposed components may be omitted.

Operation of the power-transmitting mechanism 4 when the motor 2 is driven and the spindle 3 is moved is now described.

First, while the motor 2 is not driven and the spindle 3 is held in the initial position, as shown in FIGS. 2 and 8, the rollers 45 are loosely disposed between the tapered surface 411 of the tapered sleeve 41 and the tapered surface 475 of the gear sleeve 47 (more specifically, spaced apart from the tapered surface 475). Thus, the rollers 45 are in non-frictional-contact with the tapered sleeve 41 and with the gear sleeve 47. In other words, the power-transmitting mechanism 4 is incapable of transmitting power of the motor 2 to the spindle 3 (this state is hereinafter referred to as an interruption state).

In a case in which the normal direction (screw-tightening direction) is selected via the switching lever 175 (see FIG. 1), when the trigger 173 is depressed by the user and the main switch 174 is turned ON, the controller 178 drives the motor 2 in the normal direction. The gear sleeve 47 is rotated by the power of the motor 2. Since the power-transmitting mechanism 4 is in the interruption state, the gear sleeve 47 idles around the spindle 3. A rotational direction of the gear sleeve 47 when the motor 2 is driven in the normal direction is a clockwise direction as viewed from behind.

In an idling state of the gear sleeve 47, when the user moves the screwdriver 1 forward (toward a workpiece 900 (see FIG. 9)) and presses a screw 90, which is engaged with the driver bit 9, against the workpiece 900, the spindle 3 is pushed rearward relative to the body housing 11 against the biasing force of the biasing spring 49. The gear sleeve 47 is also pushed rearward together with the interposed components by the flange 34 and moved rearward integrally with the spindle 3 relative to the body housing 11. On the other hand, as described above, the tapered sleeve 41 is biased rearward by the biasing spring 49 and held in the rearmost position (the initial position). Further, the retainer 43 and the rollers 45 are also biased rearward by the biasing spring 49 and held in a state in which movement of the retainer 43 and the rollers 45 in the front-rear direction relative to the body housing 11 is restricted. The gear sleeve 47 moves rearward toward the tapered sleeve 41, and the distance between the tapered surface 411 of the tapered sleeve 41 and the tapered surface 475 of the gear sleeve 47 in the radial direction gradually decreases.

Figure 9:
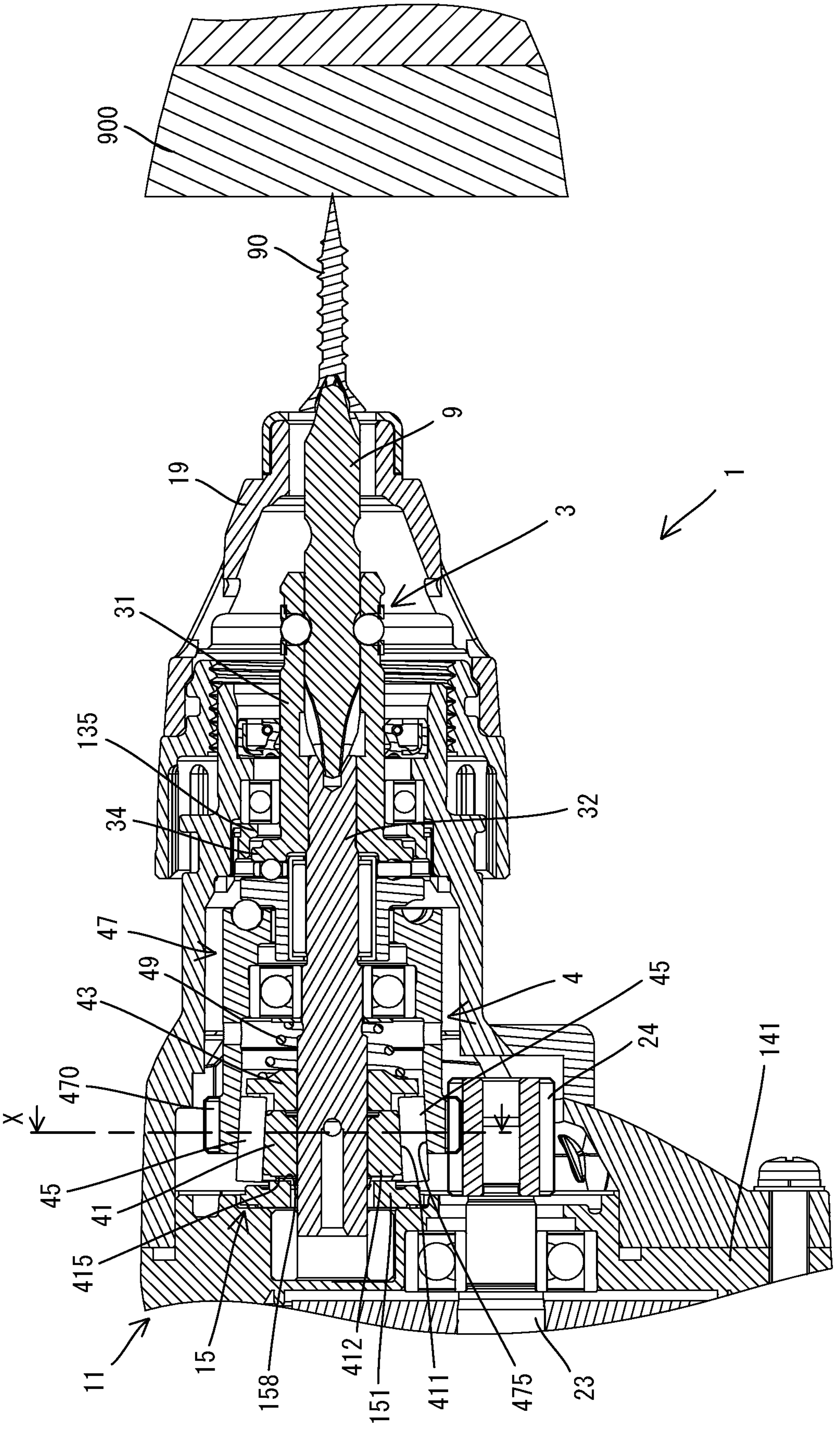
FIG. 9 is a longitudinal sectional view showing the screwdriver wherein the tapered sleeve is located at a foremost position and the power-transmitting mechanism is in a transmission state.
Figure 10:
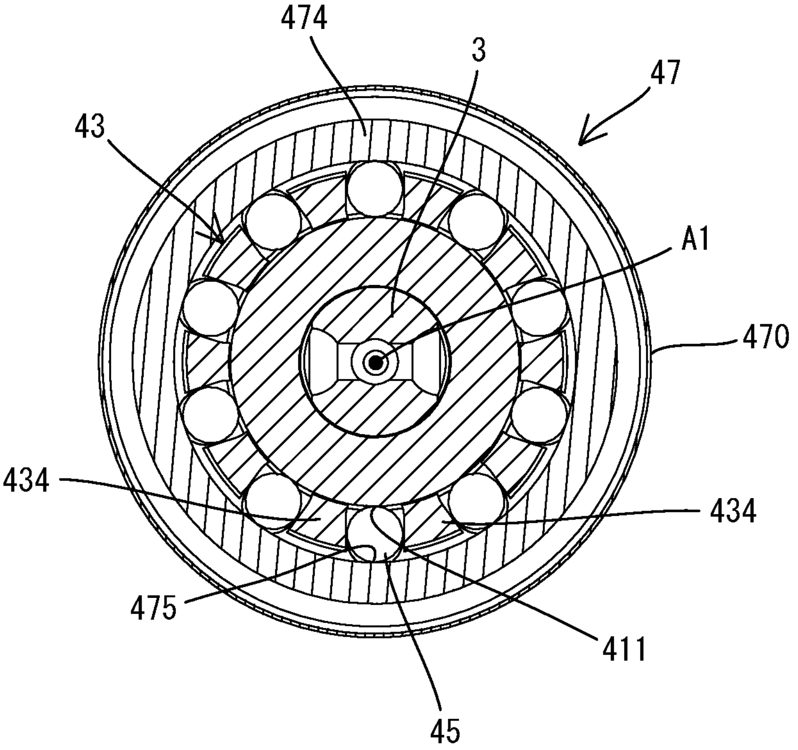
FIG. 10 is a view that corresponds to a sectional view taken along line X-X in FIG. 9, for illustrating a frictional-contact state between the rollers and the tapered sleeve and between the rollers and the gear sleeve.

Accordingly, as shown in FIGS. 9 and 10, the rollers 45 retained by the retainer 43 are held between the tapered surface 411 and the tapered surface 475 in frictional contact therewith. Specifically, frictional force is generated between portions of the rollers 45 and the tapered surface 411 that are in contact with each other, and also between portions of the rollers 45 and the tapered surface 475 that are in contact with each other. When the frictional force increases to some extent and reaches a specified threshold, the rollers 45 revolve while rotating by receiving rotational force of the gear sleeve 47. The rollers 45 cause the tapered sleeve 41 to rotate in a direction that is opposite to the rotational direction of the gear sleeve 47 (namely, in the counterclockwise direction as seen from behind (the direction of arrow A in FIG. 6)), and cause the retainer 43 to rotate in the same direction as the gear sleeve 47. Thus, the tapered sleeve 41 and the retainer 43 rotate around the driving axis A1 owing to the rotational force that is transmitted from the gear sleeve 47 via the rollers 45. In this manner, the state of the power-transmitting mechanism 4 shifts from the interruption state to a state in which the power-transmitting mechanism 4 is capable of transmitting power to the spindle 3 (this state is hereinafter referred to as a transmission state).

In response to the rotation, the tapered sleeve 41 moves forward from the rearmost position together with the retainer 43 and the rollers 45 against the biasing force of the biasing spring 49, owing to the interaction between the tapered surfaces 153 and 414 of the cam projections 152 and 413. More specifically, the tapered sleeve 41 rotates to a position where each of the restricting protrusions 416 abuts on the end 157 at the downstream side in the counterclockwise direction as seen from behind (the direction of arrow A in FIG. 7) among the two ends 156 and 157 in the circumferential direction of the corresponding restricting recess 155 of the base 15, and thereby the tapered sleeve 41 is placed at the foremost position (see FIG. 9) within its movable range. Thus, the gear sleeve 47 and the tapered sleeve 41 get closer to each other. When the tapered sleeve 41 is located at the foremost position, the protruding end surfaces 415 are spaced apart from the corresponding flat surfaces 158, while the inclined surfaces 414 and the inclined surfaces 153 are in partial contact with each other.

When the tapered sleeve 41 is placed at the foremost position, the restricting protrusions 416 respectively get into contact with the corresponding ends 157 and thus further rotation of the tapered sleeve 41 is prohibited. Thus, the tapered sleeve 41 is incapable of rotating around the driving axis A1. Accordingly, the rollers 45 revolve on the tapered surface 411 of the tapered sleeve 41 while rotating in response to the rotation of the gear sleeve 47, and thereby cause only the retainer 43 to rotate around the driving axis A1.

In this manner, in the screw-tightening operation, the spindle 3 is moved rearward from the initial position, and accordingly the state of the power-transmitting mechanism 4 shifts from the interruption state to the transmission state and the tapered sleeve 41 moves to the foremost position, thereby starting tightening the screw 90 into the workpiece 900. The spindle 3 rotates in the same direction as the gear sleeve 47 at a speed that is lower than the rotation speed of the gear sleeve 47.

Figure 11:
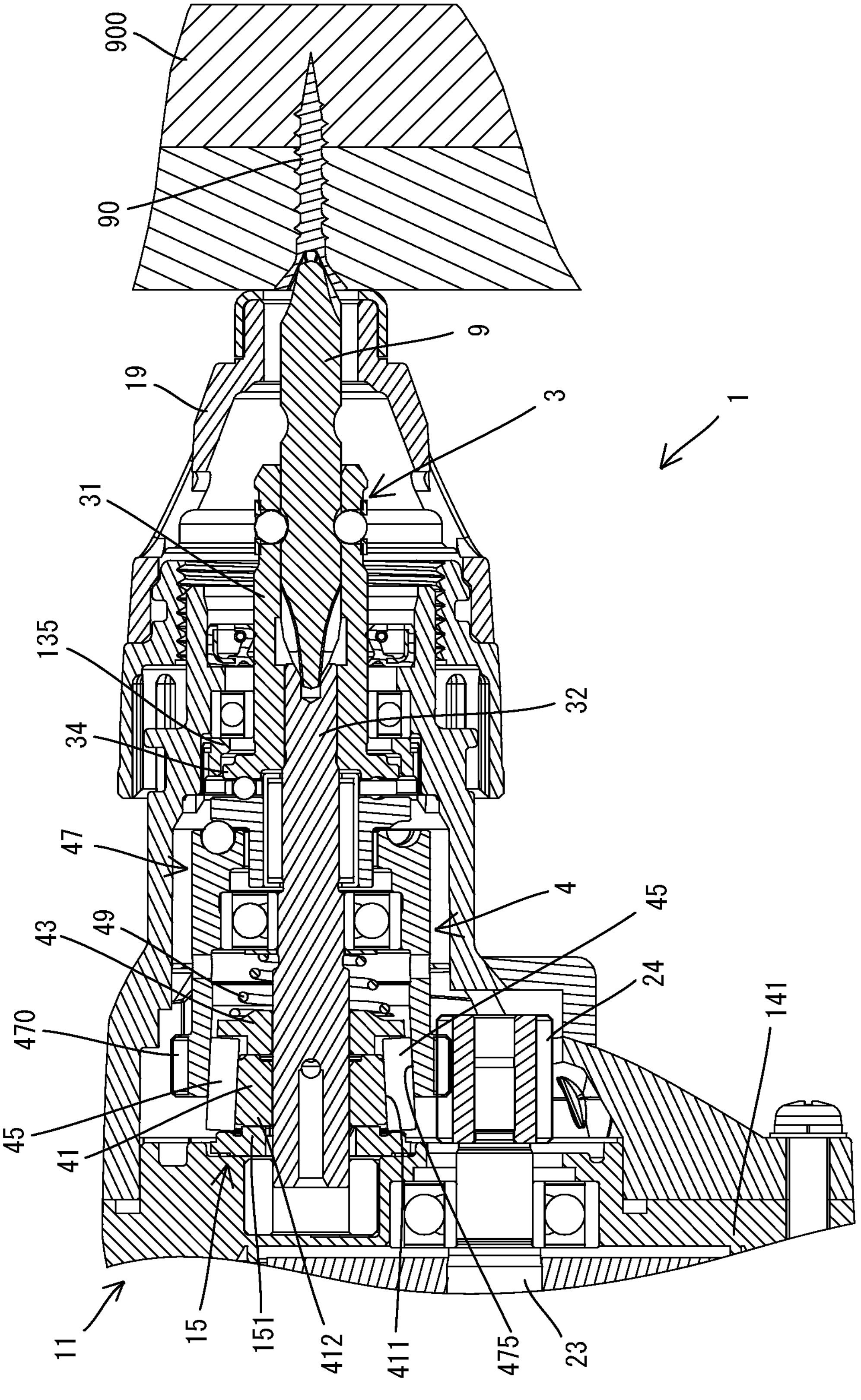
FIG. 11 is a longitudinal sectional view showing the screwdriver wherein a locator abuts on a workpiece and the tapered sleeve is back at a rearmost position.

When the operation of tightening the screw 90 into the workpiece 900 proceeds and, as shown in FIG. 11, a front end of the locator 19 comes into contact with the workpiece 900, a portion of the screwdriver 1 that is subjected to a pressing force shifts from the spindle 3 to the locator 15. Consequently, the pressing force applied to the spindle 3 gradually decreases. Thus, the frictional force between the rollers 45 and the tapered surface 411 and the frictional force between the rollers 45 and the tapered surface 475, and thus the rotational force transmitted from the gear sleeve 47 to the spindle 3 also gradually decrease. When the transmitted rotational force falls below rotational force that is required for tightening the screw 90 and the frictional force falls below the specified threshold, the tapered sleeve 41 is biased rearward by the biasing spring 49 via the retainer 43 and moved to the rearmost position while rotating in a state in which the inclined surfaces 414 are in contact with the inclined surfaces 153. Accordingly, the state of the power-transmitting mechanism 4 shifts from the transmission state to the interruption state. When the rotation of the spindle 3 is stopped, the screw-tightening operation is finished.

In a case in which the reverse direction (the screw-loosening direction) is selected via the switching lever 175, when the main switch 174 is turned ON, the controller 178 starts to drive the motor 2 in the reverse rotation. The gear sleeve 47 idles in the counterclockwise direction as seen from behind.

When the spindle 3 is pushed rearward against the biasing force of the biasing spring 49 relative to the body housing 11, the gear sleeve 47 is moved rearward to be closer to the tapered sleeve 41. Thus, the rollers 45 are held between and in frictional contact with the tapered surface 411 and the tapered surface 475. When the frictional force exceeds the threshold, the rollers 45 revolve while rotating in response to the rotational force of the gear sleeve 47. In the meantime, since the restricting protrusions 416 are respectively in contact with the ends 156 of the corresponding restricting recesses 155, rotation of the tapered sleeve 47 in the clockwise direction (the direction of arrow B in FIG. 7) as seen from behind is restricted. Thus, in loosening a screw, the tapered sleeve 41 serves as a fixed element at the rearmost position. The rollers 45 revolve while rotating on the tapered surface 411 of the tapered sleeve 41 in response to the rotation of the gear sleeve 47, and cause only the retainer 43 to rotate around the driving axis A1. In this manner, in loosening the screw, when the frictional force reaches the threshold, the state of the power-transmitting mechanism 4 shifts from the interruption state to the transmission state and the spindle 3 is rotated and the screw-loosening operation is performed in a state in which the tapered sleeve 41 remains at the rearmost position.

When the user releases the pushing while checking a degree of loosening of the screw, the frictional contact between the rollers 45 and the tapered surface 411 and between the rollers 45 and the tapered surface 475 are cancelled. Thus, the state of the power-transmitting mechanism 4 shifts from the transmission state to the interruption state, and the screw-loosening operation is finished.

As described above, the screwdriver 1 of the present embodiment includes the power-transmitting mechanism 4 that is configured to transmit power using the frictional force between the rollers 5 (the planetary members) and the tapered surface 411 of the tapered sleeve 41 (the sun member) and the frictional force between the rollers 45 and the tapered surface 475 of the gear sleeve 47 (the ring member). Further, when the frictional force between the rollers 45 and each of the tapered surfaces 411 and 475 reaches the threshold, the tapered sleeve 41 moves from the rearmost position to the foremost position. On the other hand, when the frictional force falls below the threshold, the tapered sleeve 41 moves from the foremost position to the rearmost position. In other words, when the frictional force falls below the threshold, the tapered sleeve 41 moves away from the gear sleeve 47. Thus, the screwdriver 1 can promptly interrupt the power transmission to the spindle 3 in response to the friction force falling below the threshold at the end of the screw-tightening operation.

Further, in the present embodiment, the screwdriver 1 includes the biasing spring 49 that biases the tapered sleeve 41 rearward to the rearmost position, and the cam mechanism (the cam parts 151 and 412) that is configured to convert the rotation of the tapered sleeve 41 around the driving axis A1 to the linear motion of the tapered sleeve 41 in the front-rear direction. When the frictional force between the rollers 45 and each of the tapered surfaces 411 and 475 reaches the threshold in a state in which the tapered sleeve 41 is located at the rearmost position, the tapered sleeve 41 is rotated by the power transmitted from the gear sleeve 47 and is moved to the foremost position by the cam mechanism against the biasing force of the biasing spring 49. In this manner, the biasing spring 49 and the cam mechanism realize a rational structure that is configured to hold the tapered sleeve 41 in the rearmost position when the frictional force is below the threshold and to move the tapered sleeve 41 to the foremost position when the frictional force reaches the threshold.

In particular, in the present embodiment, the cam mechanism includes the cam part 151 disposed on the base 15 (specifically, the cam protrusions 152 each having the inclined surface 153), and the cam parts 412 disposed on the tapered sleeve 41 (specifically, the cam protrusions 413 each having the inclined surface 414). Further, the base 15 is formed as a member that is separate (discrete) from the body housing 11 and is coupled to the body housing 11 to be non-rotatable around the driving axis A1. Such a structure realizes the cam mechanism that can be easily manufactured, since the cam parts 151 can be formed with the base 15 and the base 15 can be coupled to the body housing 11 afterwards.

In the present embodiment, the retainer 43 is movable together with the tapered sleeve 41 in the front-rear direction relative to the spindle 3, and the biasing spring 49 biases the tapered sleeve 41 rearward via the retainer 43. The retainer 43 needs to be arranged at a position where the retainer 43 can retain the rollers 45 such that the rollers 45 do not move out of the space between the tapered surfaces 411 and 475. To cope with this, the biasing spring 49 biases rearward the retainer 43 as well as the tapered sleeve 41, so that a positional relationship between the tapered sleeve 41 and the retainer 43 can be appropriately maintained. Further, in the present embodiment, since the biasing spring 49 also biases the rollers 45 rearward via the retainer 43, a positional relationship between the rollers 45, the tapered sleeve 41 and the retainer 43 can be also appropriately maintained.

In the present embodiment, the angle range in which the tapered sleeve 41 is rotatable around the driving axis A1 is defined by the restricting protrusions 416 and the restricting recesses 155. Since the rotation of the tapered sleeve 41 is converted into the linear motion in the front-rear direction by the cam mechanism (the cam parts 151 and 412), defining the rotatable range corresponds to defining the movable distance of the tapered sleeve 41 in the front-rear direction. Thus, the rearmost position and the foremost position of the tapered sleeve 41 can be defined, and thus the positional relationship between the tapered sleeve 41 and the gear sleeve 47 and further the relationship between the pushing amount of the spindle 3 and the rotational force to be transmitted can be stabilized. Further, by merely forming the simple restricting recesses 155 in the base 15, the movable distance of the tapered sleeve 41 in the front-rear direction can be defined. Therefore, the manufacturing cost can be suppressed, compared to a case in which a stopper is provided that abuts on the tapered sleeve 41 to restrict the forward movement of the tapered sleeve 41.

In the present embodiment, the biasing spring 49 biases the spindle 3 and the tapered sleeve 41 forward and rearward, respectively. Thus, the single biasing spring 49 realizes a structure that biases the tapered sleeve 41 toward the rearmost position and that returns the spindle 3 to the foremost position when the pushing to the spindle 3 is cancelled.

In the present embodiment, the tapered sleeve 41 is configured to move between the foremost position and the rearmost position only when the motor 2 is rotated in the normal direction. In loosening the screw, the user can easily stop the power transmission to the spindle 3 by confirming the loosening of the screw 90 and stopping pushing the spindle 3. Thus, allowing the tapered sleeve 41 to move between the foremost position and the rearmost position only in tightening a screw can eliminate the need for a complicated structure.

Correspondences between the features of the above-described embodiment and the features of the invention are as follows. However, the features of the embodiment are merely exemplary, and therefore the features of the invention are not limited thereto. The screwdriver 1 is an example of the "screw-tightening tool" according to the present invention. The driver bit 9 is an example of the "tool accessory". The body housing 11 is an example of the "housing". The spindle 3 is an example of the "spindle". The driving axis A1 is an example of the "driving axis". The motor 2 is an example of the "motor". The power-transmitting mechanism 4, the tapered sleeve 41, the gear sleeve 47, the retainer 43, and the roller 45 are examples of the "power-transmitting mechanism", the "sun member", the "ring member", the "carrier member", and the "planetary roller", respectively. The tapered surface 411 and the tapered surface 475 are examples of the "first tapered surface" and the "second tapered surface", respectively. The foremost position and the rearmost position of the tapered sleeve 41 are examples of the "first position" and the "second position", respectively. The biasing spring 49 is an example of the "spring member". The cam part 151 and the cam part 412 together form an example of the "motion converting mechanism (cam mechanism)". The cam part 151 and the cam part 412 are examples of the "first cam part" and the "second cam part", respectively. The base 15 is an example of the "cam member". The restricting recess 155 is an example of the "rotation restricting part".

The above-described embodiment is merely exemplary, and a screw-tightening tool according to the present invention is not limited to the structure of the screwdriver 1 of the above-described embodiment. For example, the following modifications may be made. Further, any one or more of these modifications may be employed independently or in combination with the screwdriver 1 of the above-described embodiment or with the invention recited in each claim.

In the power-transmitting mechanism 4, the structures (shape, size, the number thereof, etc.) and arrangements of the sun member, the ring member, the carrier member and the planetary rollers may be appropriately changed. For example, the number of the retaining arms 434 of the retainer 43, and the number of the rollers 45 are not limited to ten, and they may be appropriately changed. The retainer 43 may be fixed to the spindle 3 to be immovable in the front-rear direction. In this case, for example, a spring member that biases the tapered sleeve 41 toward the rearmost position may be disposed between the retainer 43 and the tapered sleeve 41.

In the above-described embodiment, the biasing spring 49 has various functions. Specifically, the biasing spring 49 has a function of biasing the tapered sleeve 41 serving as the sun member toward the rearmost position, a function of restricting the movement of the retainer 43 serving as the carrier member and the rollers 45 serving as the planetary roller in the front-rear direction, a function of biasing the spindle 3 toward the initial position, and a function of biasing the gear sleeve 47, the tapered sleeve 41 and the retainer 43 in directions to interrupt power transmission. Thus, the single biasing spring 49 achieve multiple functions. However, these functions may be respectively achieved by separate members (for example, spring members), or some of the functions may be omitted.

In the above-described embodiment, the cam mechanism (the cam parts 151 and 412) that utilizes the inclined surfaces 153 and 414 is described as an example of the motion converting mechanism that is configured to convert the rotation of the tapered sleeve 41 around the driving axis A1 into the linear motion of the tapered sleeve 41 in the front-rear direction. However, such a motion converting mechanism may be appropriately changed. For example, the shape, the number, and the arrangement of each of the cam protrusions 151 and 413 are not limited to those in the above-described embodiment. For example, only one of the cam parts 151 and 412 may have an inclined surface. Instead of the cam parts 151 and 412, a cam mechanism that utilizes an inclined groove (including a spiral groove) or a screw mechanism that utilizes a screw groove may be employed. Further, the body housing 11, for example, instead of the base 15, may have the cam part 151.

The structure that defines the rotatable range of the tapered sleeve 41 around the driving axis A1 is not limited to the restricting recesses 155. For example, contrary to the above-described embodiment, the base 15 may have a restricting protrusion and the tapered sleeve 41 may have a restricting recess, into which the restricting protrusion is inserted. Further, the body housing 11, instead of the base 15, may have a protrusion that defines the rotatable range by getting into contact with a portion of the tapered sleeve 41. Further, a contact part, which defines the movable distance of the tapered sleeve 41 in the front-rear direction (namely, the foremost position) by getting into contact with the tapered sleeve 41 from the front may be employed, instead of defining the rotatable range of the tapered sleeve 41 around the driving axis A1.

The shapes of the body housing 11 and the handle 17, and/or the connection structure therebetween, a kind or the arrangement of the motor 2 may be appropriately changed.

In view of the nature of the present invention and the above-described embodiment, the following structures (aspects) are provided. Any one or more of the following structures may be employed in combination with the screwdriver 1 of the embodiment, the modifications thereof, or the invention recited in each claim.

(Aspect 1)

The power-transmitting mechanism is configured such that, when the frictional force reaches a threshold, the sun member transmits the power to the spindle while moving from the first position to the second position.

(Aspect 2)

The sun member, the ring member, and the carrier member correspond to a fixed element, an input element, and an output element in a planetary-roller-type power-transmitting mechanism, respectively, and the carrier member is configured to rotate integrally with the spindle.

(Aspect 3)

The sun member is configured to serve as the fixed element at the first position when the motor is rotationally driven in a reverse direction.

(Aspect 4)

The cam mechanism includes a first cam part and a second cam part, the first cam part being disposed on the housing or on a member coupled to the housing and having a first contact surface, the second cam part being disposed on the sun member and having a second contact surface, at least one of the first contact surface and the second contact surface includes an inclined surface inclined in a circumferential direction around the driving axis, and the first cam part and the second cam part are configured to convert rotation of the sun member into linear motion of the sun member in the front-rear direction owing to sliding between the first contact surface and the second contact surface.

(Aspect 5)

The spring member biases the ring member and the sun member away from each other.

(Aspect 6)

The spring member biases the ring member and the carrier member away from each other.

(Aspect 7)

The rotation restricting part is disposed on/in the housing or on/in a member non-rotatably coupled to the housing, and is configured to restrict rotation by getting into contact with a portion of the sun member in a rotational direction of the sun member.

(Aspect 8)

The sun member includes a protrusion or a recess, and the rotation restricting part is configured as a recess that is engageable with the protrusion of the sun member, or a protrusion that is engageable with the recess of the sun member.

(Aspect 9)

The rotation restricting part is configured to prohibit rotation of the sun member when the motor is rotationally driven in the reverse direction.

(Aspect 10)

The screw-tightening tool further comprises a locator that is coupled to a front end portion of the housing and that is configured to set a screwing depth.

DESCRIPTION OF NUMERALS

1: screwdriver, 10: body, 11: body housing, 12: rear housing, 13: front housing, 135: stopper part, 14: central housing, 141: partition wall, 15: base, 151: cam part, 152: cam protrusion, 153: inclined surface 155: restricting recess, 156: end, 157: end, 158: flat surface, 159: leg, 17: handle, 171: grip part, 173: trigger, 174: main switch, 175: switching lever, 176: rotation-direction switch, 178: controller, 179: power cable, 18: handle housing, 19: locator, 2: motor, 21: rotor, 23: motor shaft, 231: bearing, 233: bearing, 24: pinion gear, 25: fan, 3: spindle, 301: bearing, 302: bearing, 31: front shaft, 311: bit-insertion hole, 32: rear shaft, 321: groove, 34: flange, 36: ball, 4: power-transmitting mechanism, 41: tapered sleeve, 411: tapered surface, 412: cam part, 413: cam protrusion, 414: inclined surface, 415: protruding end surface, 416: restricting protrusion, 419: recess, 43: retainer, 431: bottom wall, 432: recess, 433: flange, 434: retaining arm, 45: roller, 47: gear sleeve, 470: gear teeth, 471: bottom wall, 474: peripheral wall, 475: tapered surface, 48: bearing, 481: outer ring, 483: inner ring, 49: biasing spring, 9: driver bit, 90: screw, 492: washer, 900: workpiece, A1: driving axis

The invention claimed is:

1. A screw-tightening tool configured to tighten a screw by rotationally driving a tool accessory, the screw-tightening tool comprising:

a housing;

a spindle supported by the housing to be movable in a front-rear direction along a driving axis and to be rotatable around the driving axis, the driving axis defining the front-rear direction of the screw-tightening tool, the spindle having a front end portion configured such that the tool accessory is removably coupled thereto;

a motor housed in the housing; and a power-transmitting mechanism housed in the housing and including a sun member, a ring member, a carrier member and a planetary roller, the sun member, the ring member and the carrier member being arranged coaxially with the driving axis, the planetary roller being rotatably retained by the carrier member, wherein:

the sun member and the ring member have a first tapered surface and a second tapered surface, respectively, each of the first tapered surface and the second tapered surface being inclined relative to the driving axis, the power-transmitting mechanism is configured such that, when the ring member moves rearward to be closer to the sun member in response to rearward movement of the spindle, the planetary roller gets into frictional contact with the first tapered surface and with the second tapered surface and transmits power of the motor to the spindle owing to frictional force between the planetary roller and each of the first tapered surface and the second tapered surface, the sun member is movable in the front-rear direction between a first position and a second position, the second position being forward of the first position, and the sun member is configured to move from the first position to the second position when the frictional force reaches a threshold, and to move from the second position to the first position when the frictional force falls below the threshold.

2. The screw-tightening tool as defined in claim 1, further comprising:

a spring member biasing the sun member toward the first position; and a motion converting mechanism configured to convert rotation of the sun member around the driving axis into linear motion of the sun member in the front-rear direction, wherein:

the ring member is configured to be rotated by the power of the motor, and the sun member is configured to be rotated by the power transmitted from the ring member and to be moved to the second position by the motion converting mechanism against a biasing force of the spring member when the frictional force reaches the threshold in a state in which the sun member is located at the first position.

3. The screw-tightening tool as defined in claim 2, wherein:

the carrier member is movable together with the sun member in the front-rear direction relative to the spindle, and the spring member biases the sun member rearward via the carrier member.

4. The screw-tightening tool as defined in claim 2, further comprising a rotation restricting part configured to define an angle range in which the sun member is rotatable around the driving axis.

5. The screw-tightening tool as defined in claim 2, wherein the spring member biases the spindle and the sun member forward and rearward, respectively.

6. The screw-tightening tool as defined in claim 2, wherein the spring member biases the ring member and the sun member away from each other.

7. The screw-tightening tool as defined in claim 2, wherein the spring member biases the ring member and the carrier member away from each other.

8. The screw-tightening tool as defined in claim 2, further comprising:

a cam member formed separately from the housing and coupled to the housing to be non-rotatable around the driving axis, wherein the motion converting mechanism is configured as a cam mechanism including a first cam part disposed on the cam member and a second cam part disposed on the sun member.

9. The screw-tightening tool as defined in claim 2, wherein:

the carrier member is movable together with the sun member in the front-rear direction relative to the spindle, and the spring member biases the spindle forward and biases the sun member rearward via the carrier member.

10. The screw-tightening tool as defined in claim 9, wherein:

the ring member is movable in the front-rear direction together with the spindle, and the spring member biases the spindle forward via the ting member.

11. The screw-tightening tool as defined in claim 10, further comprising a rotation restricting part configured to define an angle range in which the sun member is rotatable around the driving axis.

12. The screw-tightening tool as defined in claim 1, wherein:

the motor is configured to be rotationally driven in a normal direction and in a reverse direction, the normal direction corresponding to a direction in which the tool accessory tightens the screw, the reverse direction corresponding to a direction in which the tool accessory loosens the screw, and the sun member is configured to move between the first position and the second position only when the motor is rotationally driven in the normal direction.

13. The screw-tightening tool as defined in claim 12, further comprising:

a rotation restricting part configured to allow rotation of the sun member around the driving axis within a predetermined angle range when the motor is rotationally driven in the normal direction, and to prohibit rotation of the sun member around the driving axis when the motor is rotationally driven in the reverse direction.

14. The screw-tightening tool as defined in claim 13, wherein:

the sun member has a protrusion or a recess, and the rotation restricting part is a recess that is engageable with the protrusion of the sun member, or a protrusion that is engageable with the recess of the sun member.

15. The screw-tightening tool as defined in claim 1, wherein:

the ring member is configured to be rotated by the power of the motor, and the carrier member is configured to rotate integrally with spindle.

* * * * *